US010365809B2

(12) United States Patent
Kano et al.

(10) Patent No.: US 10,365,809 B2
(45) Date of Patent: Jul. 30, 2019

(54) TOUCH INPUT DEVICE

(71) Applicant: Murata Manufacturing Co., Ltd., Nagaokakyo-shi, Kyoto-fu (JP)

(72) Inventors: Hidekazu Kano, Nagaokakyo (JP); Hiroaki Kitada, Nagaokakyo (JP); Nobuhito Tsubaki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 57 days.

(21) Appl. No.: 15/696,754

(22) Filed: Sep. 6, 2017

(65) Prior Publication Data
US 2018/0011628 A1  Jan. 11, 2018

Related U.S. Application Data

(63) Continuation of application No. PCT/JP2016/055971, filed on Feb. 29, 2016.

(30) Foreign Application Priority Data

Mar. 23, 2015 (JP) .................................. 2015-059291

(51) Int. Cl.
*G06F 3/041* (2006.01)
*G06F 3/0484* (2013.01)
(Continued)

(52) U.S. Cl.
CPC .......... *G06F 3/04845* (2013.01); *G06F 3/044* (2013.01); *G06F 3/0416* (2013.01);
(Continued)

(58) Field of Classification Search
CPC .. G09G 5/00; G06F 3/02; G06F 3/041; G06F 3/045; G06F 3/048; G06F 1/16; G01R 27/26
See application file for complete search history.

(56) References Cited

U.S. PATENT DOCUMENTS 7,969,412 B2   6/2011 Nagiyama et al.
8,477,096 B2   7/2013 Nagiyama et al.
(Continued)

FOREIGN PATENT DOCUMENTS

JP   2000-293711 A   10/2000
JP   2007-286593 A   11/2007
(Continued)

OTHER PUBLICATIONS

International Search Report issued in International Application No. PCT/JP2016/055971, dated Apr. 26, 2016.
(Continued)

*Primary Examiner* — Pegeman Karimi
(74) *Attorney, Agent, or Firm* — Arent Fox LLP

(57) ABSTRACT

A display device includes a housing, an operation surface, a position sensor, a press sensor, and a display unit. The position sensor detects a touched position on the operation surface. The press sensor detects a press on the operation surface. The display unit displays an image. When the press sensor detects a pressing amount not smaller than a first threshold, a control unit sets, as a rotation axis of a three-dimensional image, a direction orthogonal to the sliding direction of the touched position detected in the position sensor. The control unit then rotates the three-dimensional image in accordance with the sliding direction of the touched position detected in the position sensor.

27 Claims, 19 Drawing Sheets

(51) Int. Cl.
*G06F 3/044* (2006.01)
*G06F 3/0481* (2013.01)
*G06F 3/0488* (2013.01)
*G06F 3/0482* (2013.01)

(52) U.S. Cl.
CPC .......... *G06F 3/0484* (2013.01); *G06F 3/0488* (2013.01); *G06F 3/04815* (2013.01); *G06F 3/0482* (2013.01); *G06F 2203/04105* (2013.01)

(56) References Cited

U.S. PATENT DOCUMENTS

| | | | |
|---|---|---|---|
| 8,922,583 B2 | 12/2014 | Tartz et al. | |
| 9,779,481 B2 | 10/2017 | Yuasa | |
| 2007/0226646 A1 | 9/2007 | Nagiyama et al. | |
| 2008/0115091 A1* | 5/2008 | Jung | G06F 1/1626 715/867 |
| 2009/0256809 A1* | 10/2009 | Minor | G06F 3/03547 345/173 |
| 2010/0271301 A1* | 10/2010 | Ohshita | G06F 1/169 345/158 |
| 2011/0115784 A1* | 5/2011 | Tartz | G06F 1/1624 345/419 |
| 2011/0214087 A1 | 9/2011 | Nagiyama et al. | |
| 2013/0100050 A1 | 4/2013 | Profitt et al. | |
| 2014/0007005 A1* | 1/2014 | Libin | G06F 3/0485 715/784 |
| 2015/0116279 A1* | 4/2015 | Ohba | G06F 3/0418 345/178 |
| 2015/0193912 A1 | 7/2015 | Yuasa | |
| 2015/0261330 A1* | 9/2015 | Jalali | G06F 3/04815 345/173 |
| 2016/0093272 A1* | 3/2016 | Shiraga | G09G 5/38 345/649 |

FOREIGN PATENT DOCUMENTS

| | | |
|---|---|---|
| JP | 2013-25580 A | 2/2013 |
| JP | 2013-511773 A | 4/2013 |
| JP | 2013-89201 A | 5/2013 |
| JP | 2014-109888 A | 6/2014 |
| WO | WO 2014/030455 A1 | 2/2014 |

OTHER PUBLICATIONS

Written Opinion of the International Searching Authority issued in International Application No. PCT/JP2016/055971, dated Apr. 26, 2016.

* cited by examiner

TOUCH INPUT DEVICE

CROSS REFERENCE TO RELATED APPLICATIONS

The present application is a continuation of International application No. PCT/JP2016/055971, filed on Feb. 29, 2016, which claims priority to Japanese Patent Applications Nos. 2015-059291, filed on Mar. 23, 2015, the entire contents of each of which are incorporated herein by reference.

TECHNICAL FIELD

The present invention relates to a touch input device that displays an image on a screen and detects the user's operation input.

BACKGROUND ART

In recent years, dramatic improvement has been made in the performance of computers and touch input devices such as a tablet and a smartphone have become able to display three-dimensional (3D) images. The touch input devices of recent years can also perform various operations on a 3D image displayed on a screen such as enlargement, reduction, sliding, and rotation.

For example, Japanese Patent Application Laid-Open No. 2000-293711 discloses a personal computer including a mouse, a keyboard, and an auxiliary storage device with which a 3D display program is installed. The user executes this 3D display program in the personal computer and drags a 3D image by either mouse operation alone or mouse operation and keyboard operation in combination, to rotate the 3D image. This can facilitate the user to view a freely selected portion of the 3D image.

However, in the personal computer of the foregoing Japanese application, the user needs to simultaneously drag the 3D image and push a key provided in the mouse alone or pushing keys provided in the mouse and the keyboard. Hence the foregoing personal computer has a problem where the input operation is complex and is thus inconvenient for the user.

Accordingly, it is an object of the present invention to provide a touch input device capable of rotating an image by simple and intuitive input operation.

BRIEF SUMMARY OR THE INVENTION

In accordance with one aspect of the invention, a touch input device, comprises:
an operation surface;
a position sensor that detects both the presence and the movement of a touch position on the operation surface;
a pressure sensor that detects a pressing force applied to the operation surface;
a display that displays a 3D image; and
a controller that rotates the image as a function of the movement of the touch position along the operation surface when the detected pressing force satisfies a predetermined condition. In one aspect of the invention, the predetermined condition is that the pressing force is greater than or equal to a first threshold.

In another aspect of the invention when the predetermined condition is met, the image is rotated in a direction determined by a direction of movement of the touch position.

In some embodiments the operation surface, the position sensor, the press sensor and the display are laminated together to define a touch panel and the display displays the image on the operation surface.

The rotation speed at which the image is rotated by the controller can be a function of the speed at which the touch position moves across the operation surface. The amount that the image is rotated by the controller can be a function of the distance that the touch position is moved across the operation surface.

In some embodiments, an axis of rotation about which the controller rotates the image passes through a previously set center of rotation at an angle that is a function of a direction movement of the touch position across the operation surface. The axis of rotation may be orthogonal to a direction of movement of the touch position across the operation surface.

In some embodiments the display displays a plurality of 3D images and the controller allows the user of the touch input device to select one of the images as the image to be rotated. The controller may permit the user of the touch input device to select the image to be rotated by touching the operation surface at a touch position corresponding to the selected image and simultaneously applying a pressing force to the operation surface which is less than or equal to a predetermined value.

In some embodiments the controller stops rotating the image when the pressing force applied to the operation surface becomes smaller than a second threshold which is less than the first threshold. The controller may also stop rotating the image when the pressing force applied to the operation surface is equal to or larger than a third threshold which is greater than the first threshold. As another example, the controller may stop rotating the image when it determines that the touch position is no longer present.

In some embodiments, the controller rotates the object when the pressing force is greater than a predetermined value and moves the object across the operation surface when the pressing force is less than the predetermined value.

The invention is also directed toward a system comprising a display and a touch input device, the touch input device including:
an operation surface;
a position sensor that detects both the presence and the movement of a touch position on the operation surface;
a pressure sensor that detects a pressing force applied to the operation surface; and
a controller displays an image on the display and rotates the image as a function of the movement of the touch position along the operation surface when the detected pressure satisfies a predetermined condition.

In some embodiments, when the predetermined condition is met, the image is rotated in a direction determined by a direction of movement of the touch position. The predetermined condition may that the pressing force is greater than or equal to a first threshold. The speed at which the image is rotated by the controller may be a function of the speed at which the touch position moves across the operation surface. The an amount that the image is rotated by the controller any be a function of the distance that the touch position is moved across the operation surface.

According to the present invention, the touch input device can rotate an image by simple and intuitive input operation.

MODE FOR CARRYING OUT THE INVENTION

A display device according to an embodiment of the present invention will be described with reference to the drawings.

Figure 1:
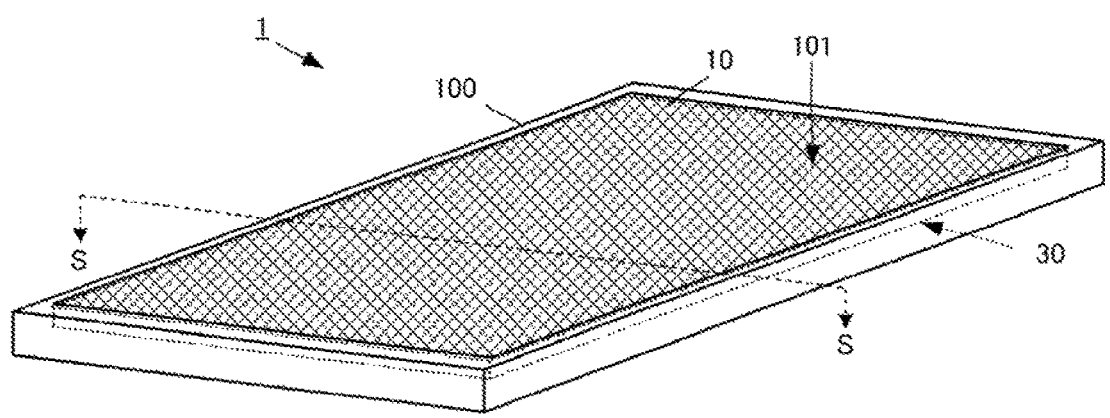
FIG. 1 is an external perspective view of a display device according to an embodiment of the present invention.
Figure 2:
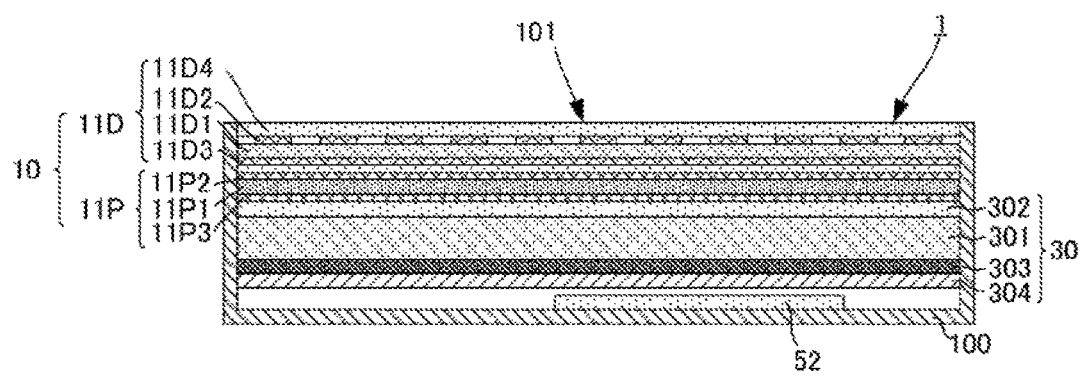
FIG. 2 is a sectional view along line S-S shown in FIG. 1.
Figure 5:
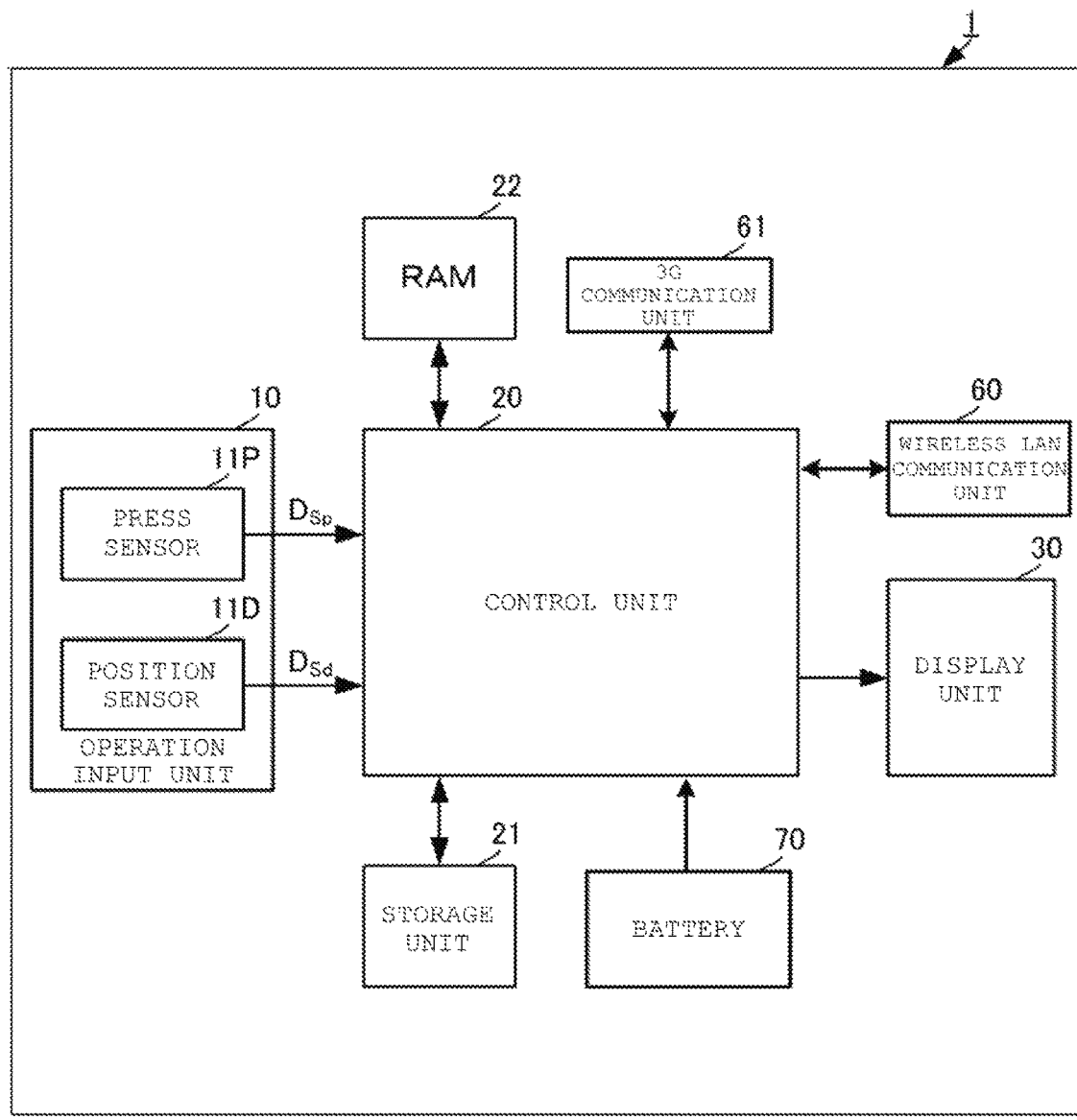
FIG. 5 is a block diagram of a display device 1 shown in FIG. 1.

As shown in FIG. 1, the display device 1, for example a tablet or cell phone, includes a housing 100 having a size allowing it to be portable. Housing 100 preferably has a rectangular parallelepiped shape, with its length and width being larger than its thickness, and an open top surface which is covered by a transparent operation input unit 10 whose top surface functions as an input operation surface 101. As shown in FIGS. 1, 2 and 5, the housing 100 contains a preferably capacitive position sensor 11D, a press sensor 11P, a display unit 30, a control circuit module 52, and a battery 70. The position sensor 11D and the press sensor 11P cooperate to form the operation input unit 10. The operation surface 101, the position sensor 11D, the press sensor 11P, and the display unit 30 form a touch panel. The position sensor 11D, the press sensor 11P, and the display unit 30 preferably have a flat-plate shape such that the respective flat-plate surfaces are parallel to the operation surface 101 of the housing 100.

A circuit board (not shown) is preferably disposed between the bottom surface of the housing 100 and the display unit 30 and a control circuit module 52 is preferably mounted on the circuit board. As shown in FIG. 5, the control circuit module 52 includes a control unit 20, a storage unit 21, a RAM 22, a wireless LAN communication unit 60, and a 3G communication unit 61 and is connected to the position sensor 11D, the press sensor 11P, the display unit 30, and the battery 70.

Figure 3:
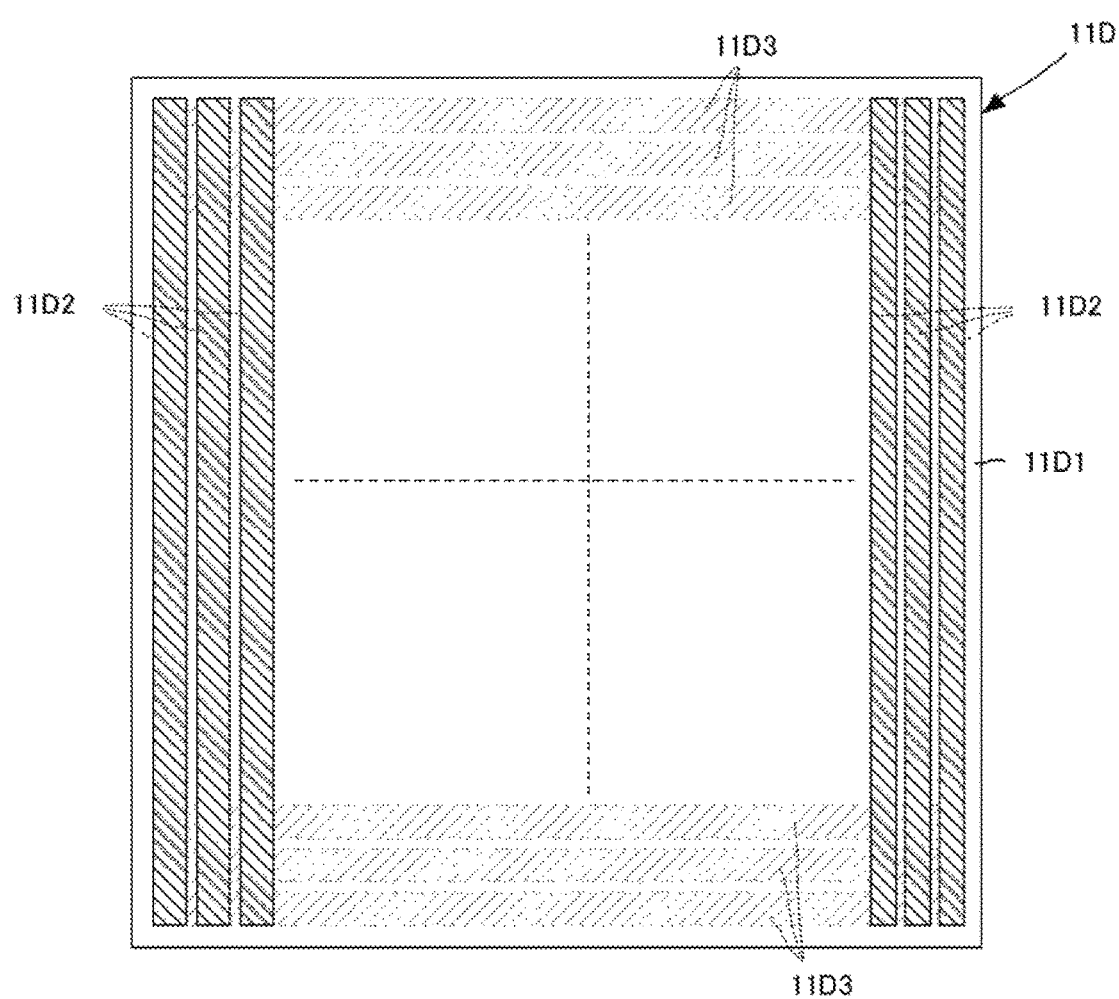
FIG. 3 is a plan view of a position sensor 11D shown in FIG. 2.

As shown in FIGS. 2 and 3, the position sensor 11D preferably includes a flat-plate insulating substrate 11D1, a plurality of capacitance detecting electrodes 11D2, a plurality of capacitance detecting electrodes 11D3, and a protective film 11D4.

The protective film 11D4 is provided on the opposite-side surface of the position sensor 11D from the press sensor 11P. The protective film 11D4 is preferably made of a material that has translucency, flexibility and insulating properties. For example, polyethylene terephthalate (PET) or polypropylene (PP) may be used for the protective film 11D4.

The insulating substrate 11D1 is also preferably made of a material having translucency. As shown in FIGS. 2 and 3, a plurality of first capacitance detection electrodes 11D2 are located on the upper main surface of the insulating layer 111D1. These electrodes extend parallel to and are spaced from one another. A plurality of second capacitance detection electrodes 11D3 are located on the opposed lower main surface of the insulating substrate 11D1 and extend parallel to one another in a direction orthogonal to the first capacitance detection electrodes 11D2. The second capacitance detection electrodes 11D3 are spaced apart from one another as shown. The plurality of capacitance detecting electrodes 11D2, 11D3 are preferably made of materials having translucency.

The position sensor 11D, via the capacitance detecting electrodes 11D2, 11D3, detects a capacitance change which occurs when the user's finger approaches or comes into contact with the operation surface 101 and outputs a position detection signal based on this detection to the control circuit module 52. The position detection signal is indicative of the position on the operation surface 101 that is touched by, e.g., a user's finger and movement of the user's finger along the surface of the operation surface 101.

Figure 4:
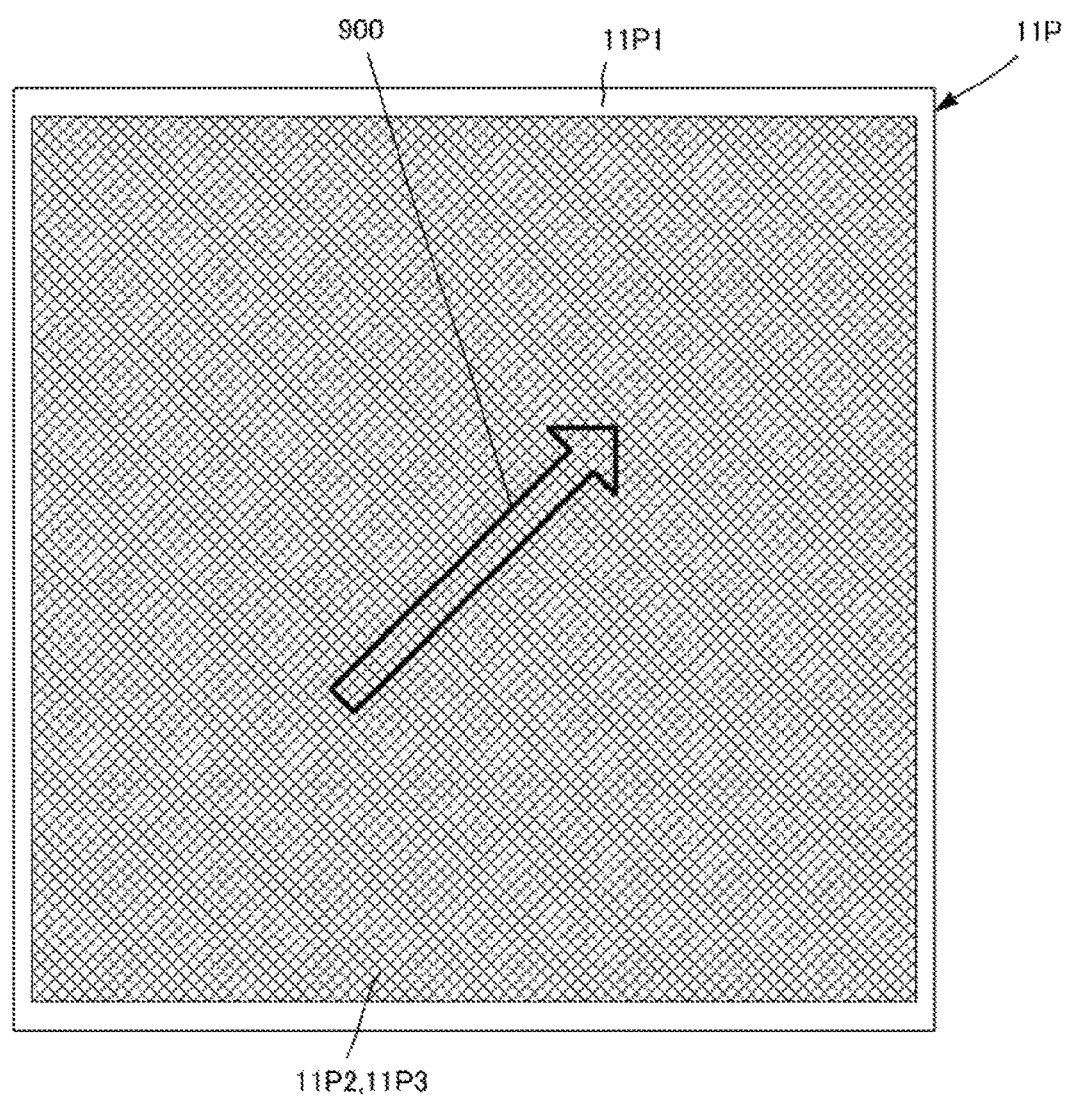
FIG. 4 is a plan view of a press sensor 11P shown in FIG. 2.

As illustrated in FIGS. 2 and 4, the press sensor 11P preferably includes a flat-film piezoelectric film 11P1 and press detection electrodes 11P2, 11P3 formed on opposite main surfaces of the piezoelectric firm 11P1. The press detection electrodes 11P2, 11P3 are preferably formed substantially throughout the flat-film surface on which they are respectively formed.

The press sensor 11P detects, in the press detection electrodes 11P2, 11P3, charges generated when the piezoelectric film 11P1 is deformed by a pressing force applied to the operation surface 101 by, e.g., the user's finger and outputs a press detection signal to the control circuit module 52 as a function thereof.

Although the piezoelectric film 11P1 may simply be a film having piezoelectricity, it is preferably formed of uniaxially stretched polylactic acid (PLA), and more preferably formed of L-polylactic acid (PLLA).

PLLA is chiral polymer, and its main chain has a spiral structure. PLLA has piezoelectricity when PLLA is uniaxially stretched and molecules are oriented. By pressing of the flat-film surface of the piezoelectric film, uniaxially stretched PLLA generates an electric charge. In this regard, an amount of the generated electric charge is uniquely decided based on an amount of displacement of the flat-film surface displaced by a press in a direction orthogonal to the flat-film surface. A piezoelectric constant of uniaxially stretched PLLA belongs to a group of very high piezoelectric constants among polymers.

Thus, the use of PLLA enables reliable and highly sensitive detection of displacement due to a press. Hence it is possible to detect a press with reliability and detect a pressing amount with high sensitivity.

Note that a stretch ratio is preferably about three to eight times. Performing heat treatment after stretching encourages crystallization of extended chain crystal of polylactic acid, to improve the piezoelectric constant. Note that in the case of biaxial stretching, it is possible to obtain a similar effect to that of uniaxial stretching by making stretch ratios of the respective axes different. For example, when a sheet is stretched eight times in a given direction as the X axis direction and is stretched two times in the Y axis direction orthogonal to the X axis, it is possible to obtain substantially the same effect of the piezoelectric constant as in a case where a sheet is uniaxially stretched four times in the X axis direction. Since a simply uniaxially stretched sheet is likely to be broken in a stretching axis direction, it is possible to increase the strength to some extent by biaxially stretching as described above.

Further, PLLA generates piezoelectricity as a result of molecule orientation processing by stretching or the like, and does not require polling processing unlike other polymers such as polyvinylidene fluoride (PVDF) or piezoelectric ceramics. That is, the piezoelectricity of PLLA not belonging to ferroelectrics is exhibited not by ion polarization as in ferroelectrics such as PVDF or lead zirconate titanate (PZT), but derives from a helical structure which is a characteristic structure of molecules.

Hence, PLLA does not exhibit pyroelectricity that is generated by other ferroelectric piezoelectric bodies. The piezoelectric constant of PVDF or the like temporally fluctuates and remarkably decreases depending on cases, whereas the piezoelectric constant of PLLA is temporally very stable. Thus, displacement by a press can be detected with high sensitivity without being influenced by a surrounding environment.

As illustrated in FIGS. 2 and 4, the piezoelectric film 11P1 subjected to such uniaxial stretching processing is preferably disposed in the housing 100 such that a uniaxially stretching direction 900 forms an angle of substantially 45° with respect to two orthogonal directions along the side surface of the housing 100. By the placement described above, it is possible to detect displacement with higher sensitivity. It is thereby possible to detect a press and a pressing amount with higher sensitivity.

As illustrated in FIGS. 2 and 4, the press detection electrodes 11P2, 11P3 are preferably formed using one of an organic electrode mainly composed of polythiophene or polyaniline and an inorganic electrode of ITO, ZnO, silver nanowire, carbon nanotube electrode, graphene, or the like. The use of these materials can form a conductor pattern with high translucency.

As shown in FIGS. 1 and 2, the display unit 30 is disposed below the operation input unit 10 inside the housing 100. The display unit 30 is preferably made of a so-called flat display and is preferably a liquid crystal element. The display unit 30 includes a liquid crystal panel 301, a top surface polarizing plate 302, a rear surface polarizing plate 303, and a backlight 304. The top surface polarizing plate 302 and the rear surface polarizing plate 303 are disposed so as to hold the liquid crystal panel 301 there between. The backlight 304 is disposed on the opposite side of the rear surface polarizing plate 303 from the liquid crystal panel 301.

As illustrated in FIG. 5, the display device 1 includes the operation input unit 10, the control unit 20, the storage unit 21, the RAM 22, the display unit 30, the wireless LAN communication unit 60, the 3G communication unit 61, and the battery 70.

The wireless LAN communication unit 60 and the 3G communication unit 61 preferably have antennas, not shown. The wireless LAN communication unit 60 preferably communicates with a server device (not shown) via a wireless LAN rooter connected to the Internet. The 3G communication unit 61 preferably communicates with the server device (not shown) via a base station connected to a mobile phone network. The battery 70 supplies a DC operation current to each unit of the display device 1.

The storage unit 21 is preferably a flash memory and stores a control program which allows the control unit 20 to carry out a control method described below with reference to FIG. 6. The control program is preferably installed as a plurality of pieces of application software including image display software described later. The image display software includes a moving mode for moving an image and a rotation mode for rotating an image.

The control unit 20 is preferably a CPU and has a timer circuit for counting the current time and the current date. The control unit 20 preferably controls operation of each unit of the display device 1 in accordance with the control program saved in the storage unit 21. The control unit 20 expands the data processed in the control program to the RAM 22.

As noted above, the operation input unit 10 includes the press sensor 11P and the position sensor 11D. Further, the operation input unit 10 preferably has a physical end key (not shown) for finishing activated application software.

When the operation surface 101 of the operation input unit 10 is pressed, the press sensor 11P generates a press detection signal DSp indicative of a pressing amount applied to the operation surface 101 and outputs the press detection signal to the control unit 20.

The position sensor 11D generates a position detection signal DSd indicative of a value of a detected capacitance of each electrode in the operation input unit 10 and outputs it to the control unit 20. The value of the positon detection signal DSd of the position detection signal is a function of the amount of change in capacitance which occurs when the user's finger approaches (comes close to) or comes into contact with the position sensor 11D. When the control unit 20 detects that the position detection signal DSd is larger than a predetermined threshold, it recognizes a touched position from the position detection signal.

The control unit 20 determines an operation input by the user's finger based on both the press detection and position detection signals and stores the result of that determination in the storage unit 21. The control unit 20 generates image data based on the decided operation input content and outputs the generated image data to the display unit 30.

Figure 7:
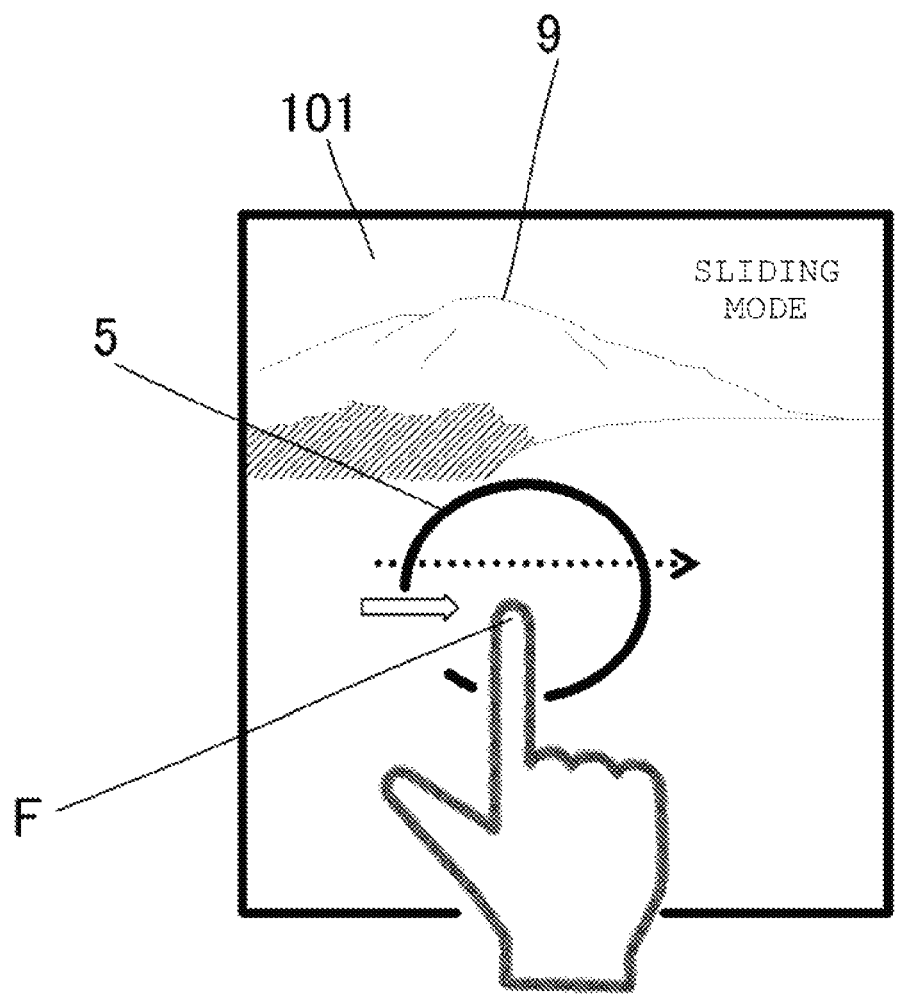
FIG. 7 is a view showing an example of sliding of a 3D image 5 displayed on an operation surface 101 shown in FIG. 1.
Figure 8:
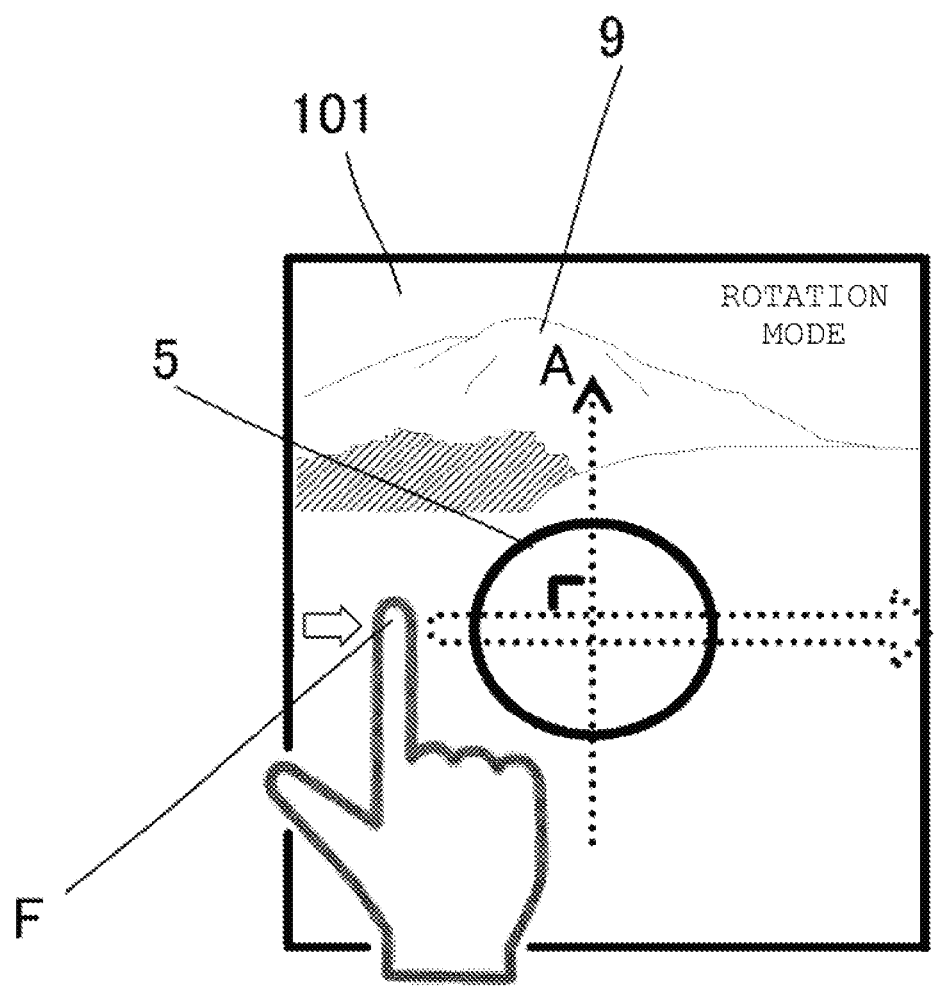
FIG. 8 is a view showing an example of setting of a rotation axis A in the 3D image 5 displayed on the operation surface 101 shown in FIG. 1.
Figure 9:
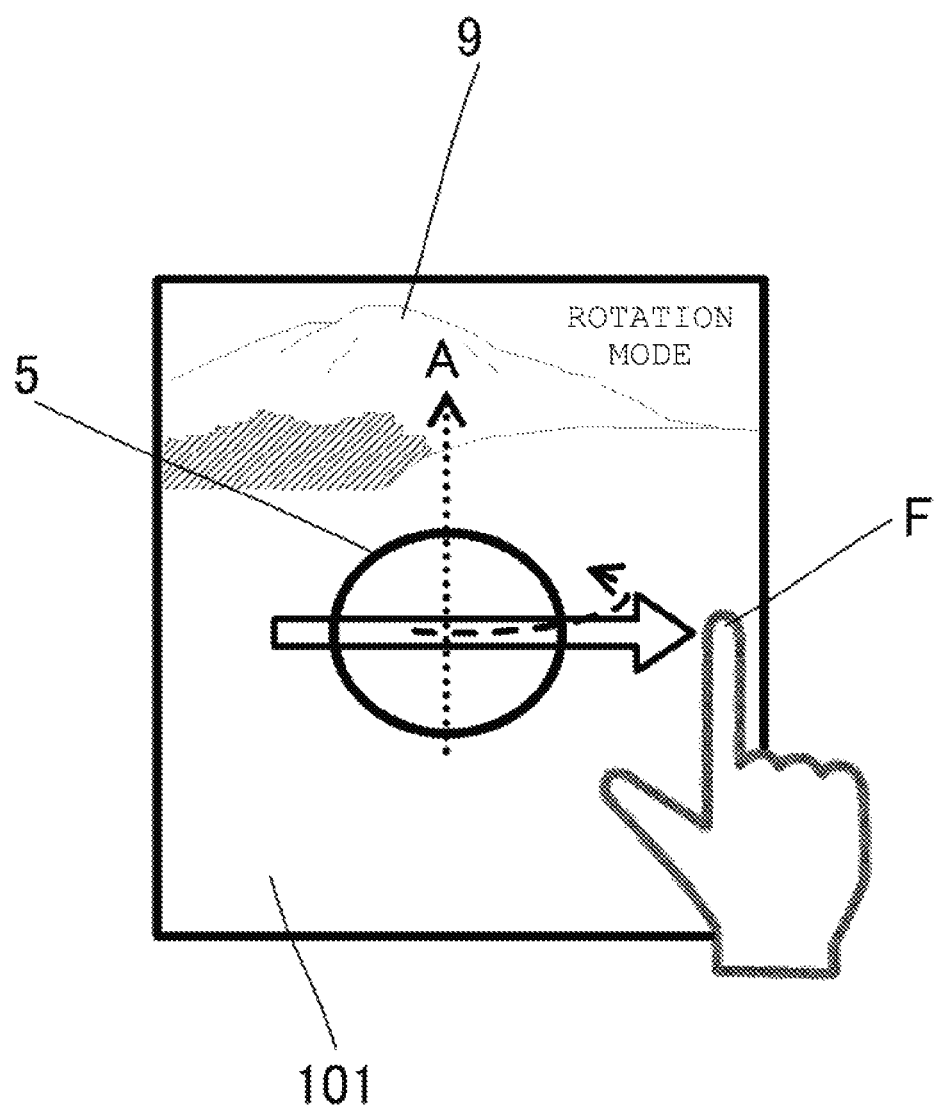
FIG. 9 is a view showing an example of rotation of the 3D image 5 shown in FIG. 8.

The display unit 30 displays an image on the operation surface 101 based on the image data. For example, the display unit 30 displays icons for a plurality of pieces of installed application software on the operation surface 101. For example, when the user touches the icon for the image display software out of the plurality of pieces of application software displayed on the operation surface 101, the control unit 20 activates the image display software. When the control unit 20 activates the image display software, the display unit 30 displays on the operation surface 101 an image including both a 3D image 5 and a background image 9 as shown in FIGS. 7, 8, and 9 in accordance with the instruction by the control unit 20.

Hereinafter, the operation of the control unit 20 at the time of activating the image display software will be described with reference to the drawings. FIG. 6 is a flowchart showing processing to be executed by the control unit 20 shown in FIG. 5. FIG. 7 is a view showing an example of sliding of the 3D image 5 displayed on the operation surface 101 shown in FIG. 1. FIG. 8 is a view showing an example of setting of a rotation axis A in the 3D image 5 displayed on the operation surface 101 shown in FIG. 1. FIG. 9 is a view showing an example of rotation of the 3D image 5 displayed on the operation surface 101 shown in FIG. 1.

In this example, the 3D image 5 has a spherical shape. An outlined arrow shown in each of FIGS. 7, 8, and 9 shows a path of movement of the user's finger F. While the example of the user's finger is described, any other object, for example a stylus, can be used. Further, a dotted arrow shown in FIG. 7 shows a sliding direction of the 3D image 5. An outlined dotted arrow shown in FIG. 8 shows a path of movement of the user's finger F. Further, a dotted arrow shown in FIG. 9 shows a rotation direction of the 3D image 5.

Figure 6:
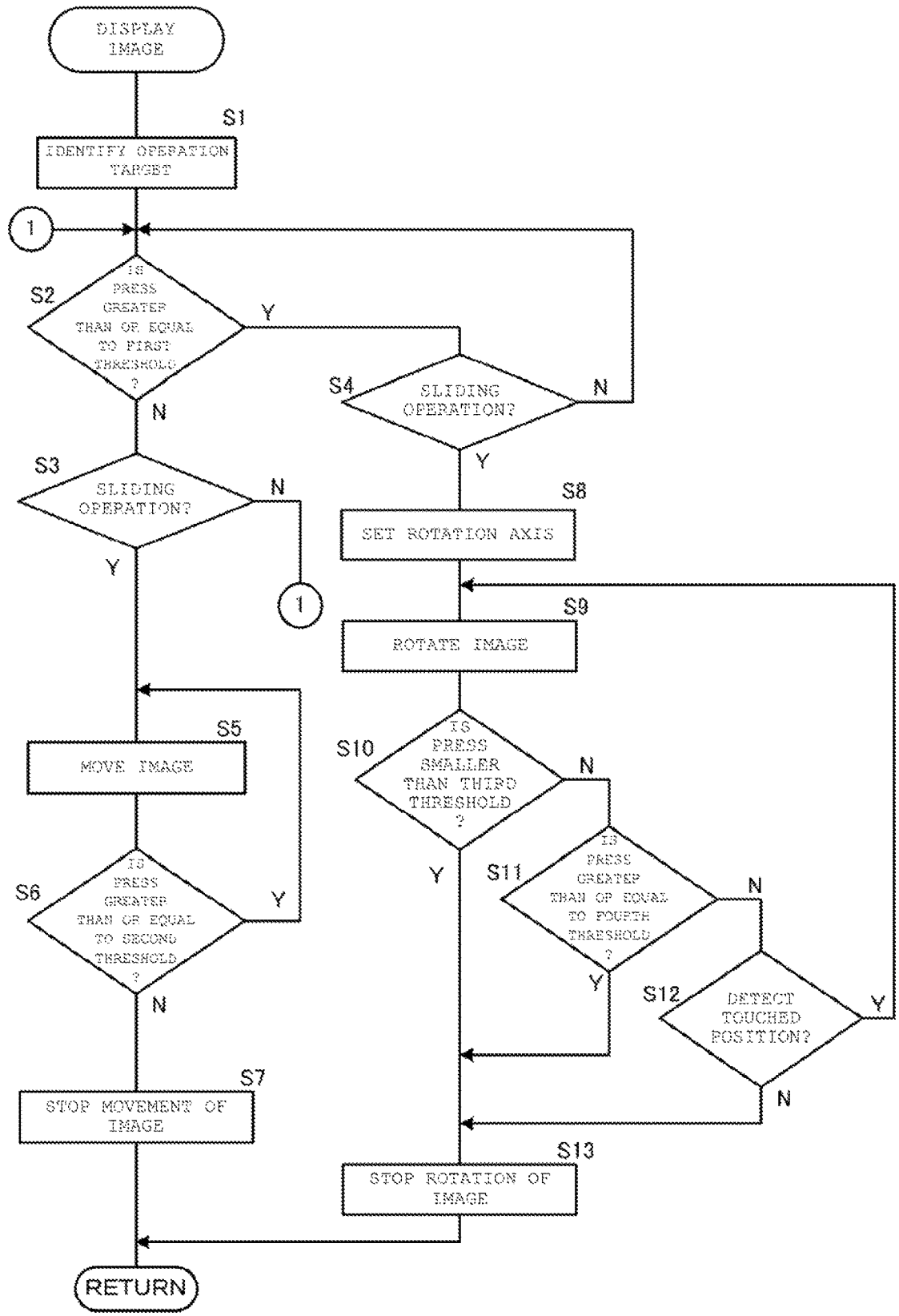
FIG. 6 is a flowchart showing processing to be executed by a control unit 20 shown in FIG. 5.

Turning to the control method illustrated in FIG. 6, in step S1 the control unit 20 identifies the 3D image 5 as an operation target. In step S2, control unit 20 detects a pressing force (indicated by press detection signal DSp) applied to the operation surface 101 and determines if it is greater than or equal to a first pressing threshold. If it is not, control unit sets the operation mode to the image moving mode and moves to step S3. In step S3, control unit 20 determines whether a sliding operation has taken place by first determining whether the pressing force has become less than the first pressing threshold but greater than a second pressing threshold (which is less than the first threshold and preferably near zero) and then determining if the position of the user's finger (i.e., the touch position) has moved across the operation surface 101 by determining whether there is a change in the position detection signal DSd. If (a) the pressing amount is greater than the second threshold and less than the first threshold and (b) the user's finger has moved, (Y in step S3), the control unit 20 begins moving the operation target in the direction of the user's finger's movement as shown in FIG. 7.

The control unit 20 continues to move the operation target until the pressing amount becomes smaller than the second pressing threshold (step S6) and, when it does, stops movement of the image (step S7). At this point, the operation sequence returns to step S1.

Returning to step S2, if the press amount is greater than or equal to the first threshold, the control unit sets the operation mode to the image rotating mode and moves to step S4. In step S4, control unit 20 determines whether a sliding operation has taken place. In a manner similar to step S3, it makes this determination by first determining whether the pressing force (indicated by the press detection signal DSp) has become less than the first pressing threshold but greater than a second pressing threshold (which is less than the first pressing threshold) and then determining if the position of the user's finger has moved across the operation surface 101 by determining whether there is a change in the position detection signal DSd. If (a) the pressing force is greater than the second pressing threshold and less than the first pressing threshold and (b) the user's finger has moved, (Y in step S4), the control unit 20 moves to step S8 and sets a rotation axis as shown in FIG. 8. More particularly, based on a predetermined rotation center of the object target, the control unit 20 sets a direction A, which is orthogonal to the direction of movement of the user's finger, as the rotation axis of the 3D image 5. In the present embodiment, the rotation center of the 3D image 5 is the center of the 3D image 5 which is a sphere. The rotation axis A of the 3D image 5 passes through the rotation center of the 3D image 5.

Moving to step S9, the control unit 20 instructs the display unit 30 to rotate the 3D image 5 in accordance with the sliding direction of the touch position detected in the position sensor 11D. In step S9, the rotation speed of the 3D image 5 preferably corresponds to the speed at which the user's finger (and therefore the touch position) moves across the operation surface 101 and the amount that the 3D image 5 rotates preferably corresponds to the distance the user's finger (and therefore the touch position) moves across the operation surface 101.

The control unit 20 then moves to step S10 and determines if the pressing force on the operation surface 101 is smaller than a third threshold which is a smaller value than the first threshold (i.e., has become very light) and is preferably close to zero. If the pressing force on the operation surface 101 is smaller than the third threshold, the control unit 20 moves to step S13 and stops rotation of the image. The operation flow then returns to step S1.

If the pressing force on the operation surface 101 is not smaller than the third threshold, the control unit 20 moves to step S11 and determines if the pressing force is equal to or larger than a fourth threshold which is a larger value than the first threshold. That is, it determines if a large pressure has been applied to the operation surface 101. If the pressing force is equal to or larger than the fourth threshold, the operation flow moves to step S13 and the rotation of the image is stopped. Thereafter, the operation flow returns to step S1.

If the pressing force is not equal to or larger than the forth threshold, control unit 20 moves to step S12 and determines whether a touch is still detected. If it is, the operation flow returns to step S9. If it is not, the operation flow proceeds to step S13 and the rotation of the object is stopped. Finally, the operation flow returns to step 1.

As a result of the control method described with reference to FIG. 6, the display unit 30 rotates the 3D image 5 in response to the user pressing his finger on the operation surface 101 and moving it along the operation surface 101. This is a simple, one finger (or other object) input that causes the 3D image to rotate. Accordingly, the display device 1 can rotate the 3D image 5 by simple and intuitive input operation. In addition, the user can control the rotation speed and amount by the simply varying the speed and distance of movement of his or her finger across the operation surface 101. Accordingly, the display device 1 can achieve more intuitive input operation.

In addition, the user can stop the rotation of the 3D image 5 by simply taking his or her finger F off the operation surface 101. In the preferred embodiment, the rotation of the 3D image 5 may be stopped at the point in time when the user's finger F is taken off of the operation surface 101 or, alternatively, the rotation speed may be gradually decreased from the point in time when the user's finger F is taken off the operation surface 101. Further, the user can stop the display unit 30 from rotating the 3D image 5 simply by pressing a part of the operation surface 101 with his or her finger F with sufficient force. Accordingly, the display device 1 can stop rotation of the 3D image 5 using a simple and intuitive input operation.

As shown in FIGS. 7, 8, and 9, the current operation mode (i.e., the moving mode or the rotation mode) is preferably displayed on the display. In addition or alternatively, the operation mode may be expressed by generating a sound with or by vibrating the touch input device. This enables the user to know the current operation mode, thereby preventing erroneous operation.

In the preferred embodiment, the 3D image moves when the user presses lightly against the operation surface 101 and rotates when the user presses strongly against the operation surface 101. However, the invention is not limited to this embodiment. For example, the opposite setting to S2 may be made, namely, the 3D image moves when the user presses strongly on the operation surface 101 and the 3D image rotates when the user presses lightly on the operation surface 101.

Next, the display device according to another embodiment of the present invention will be described with reference to the drawings. In this context, a scene will be described where a plurality of candidates for the operation target are present in the image.

Figure 10:
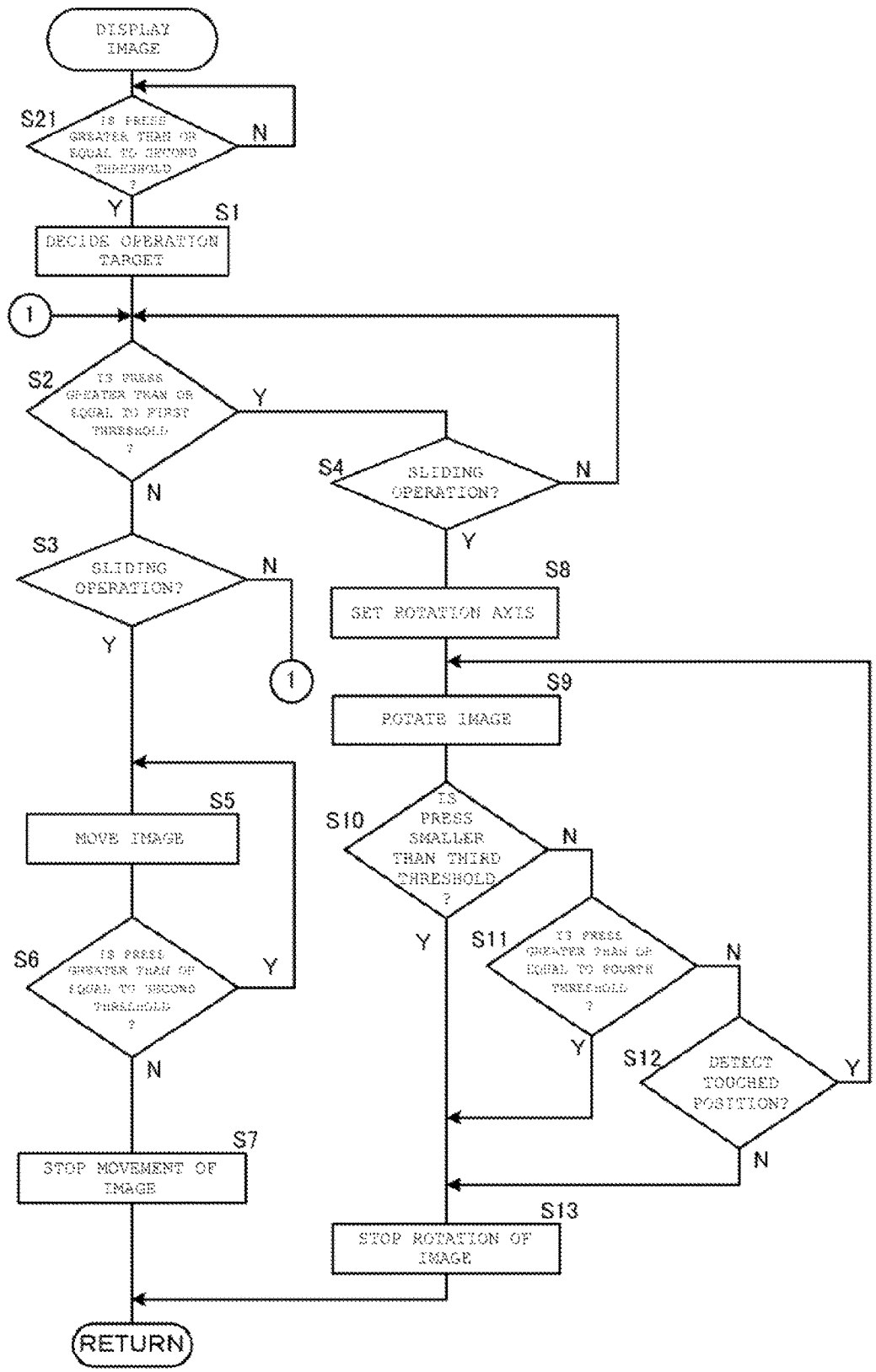
FIG. 10 is a flowchart showing processing to be executed by the control unit 20 of the display device according to another embodiment of the present invention.
Figure 11:
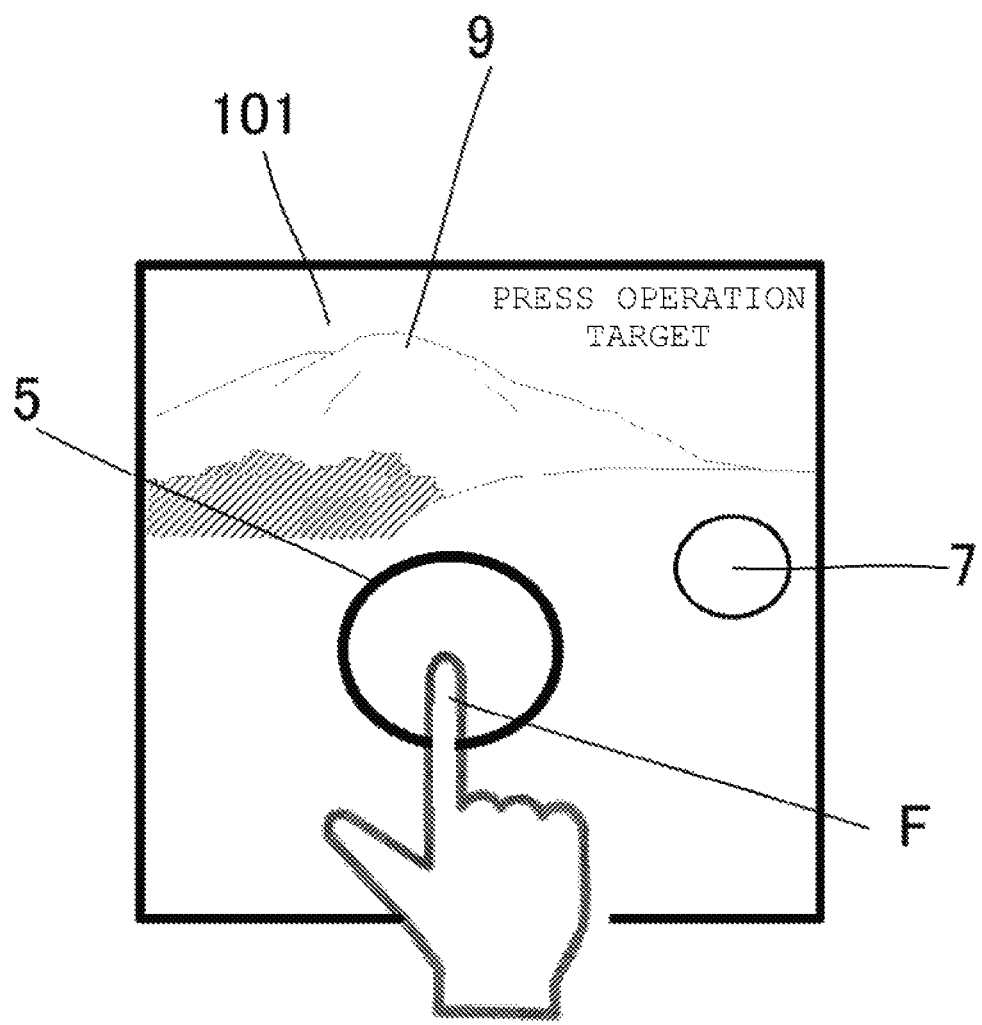
FIG. 11 is a view showing an example of a plurality of 3D images 5, 7 displayed on the operation surface 101 shown in FIG. 1.

FIG. 10 is a flowchart showing a control method to be executed by the control unit 20 of the display device according to another embodiment of the present invention. FIG. 11 is a view showing an example of a plurality of 3D images 5, 7 displayed on the operation surface 101 shown in FIG. 1.

As illustrated in FIG. 10, the control method to be executed by the control unit 20 is the same as that shown in FIG. 6 but includes the added step S21. Since the other steps S1 to S13 are the same, the description thereof is omitted.

When the control unit 20 activates the image display software it causes the display unit 30 to display on the operation surface 101 an image including a plurality of 3D images 5 and 7 and a background image 9 as shown in FIG. 11. In step S21, the control unit 20 determines whether the pressing amount applied to the operation surface 101 is equal to or larger than the second threshold. Let's assume the user presses (selects) the 3D image 5. When the pressing amount is equal to or larger than the second threshold, the control unit 20 identifies the pressed 3D image 5 as the operation target (S1). The control unit 20 continues similar processing afterward.

In the above embodiments, the control unit 20 executes the image display software to slide or rotate the 3D image, but this is not restrictive. For example, the control unit 20 can execute another software (e.g., game software) to slide or rotate the 3D image.

In the above embodiments, the press sensor 11P is made of the piezoelectric film 11P1, but this is not restrictive. The press sensor may be made of a film other than the piezoelectric film. For example, the press sensor formed by disposing a piezoelectric ceramic element around the position sensor. However, in a terminal having a large screen such as a tablet or a smartphone, a piezoelectric film capable of detecting a press on the surface is preferably used.

In the above embodiments, the user performs the touch operation and the press operation on the operation surface 101 while viewing the image displayed on the operation surface 101 of the touch panel, but this is not restrictive. For example, a personal computer that includes a display for displaying an image, and a touch pad having the position sensor 11D and the press sensor 11P may be used. In this case, the user performs the touch operation and the press operation on the operation surface of the touch pad while viewing an image displayed on the display.

Figure 12:
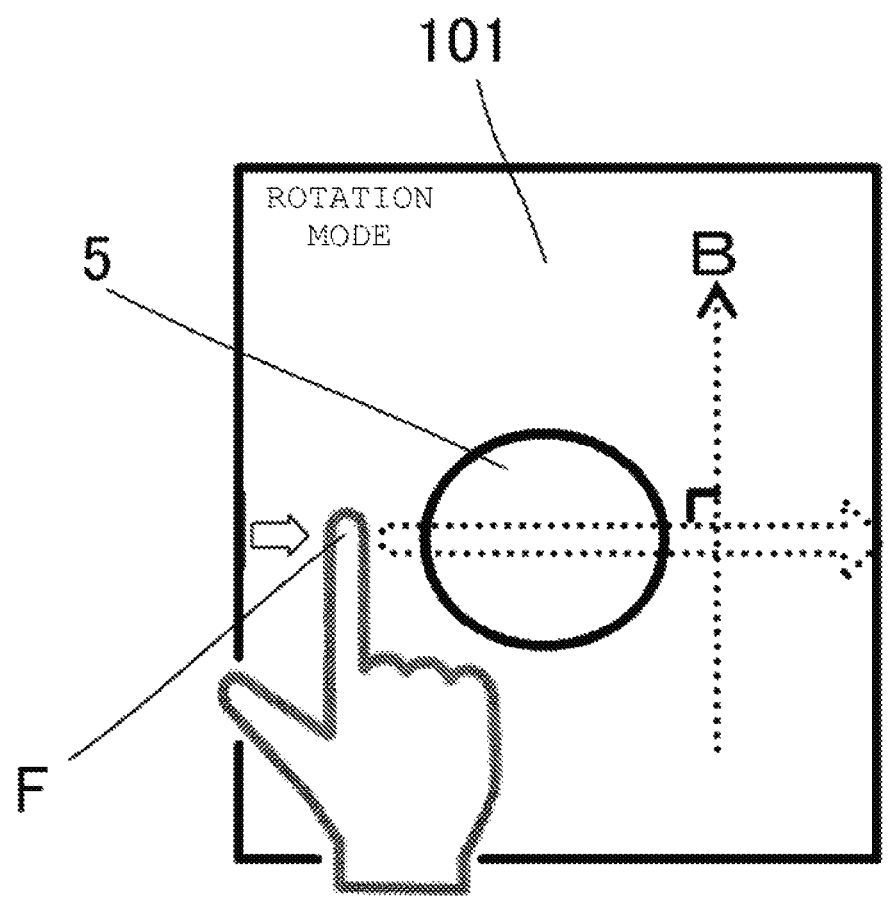
FIG. 12 is a view showing an example of setting of a rotation axis B in the 3D image 5 displayed on the operation surface 101 shown in FIG. 1.
Figure 13:
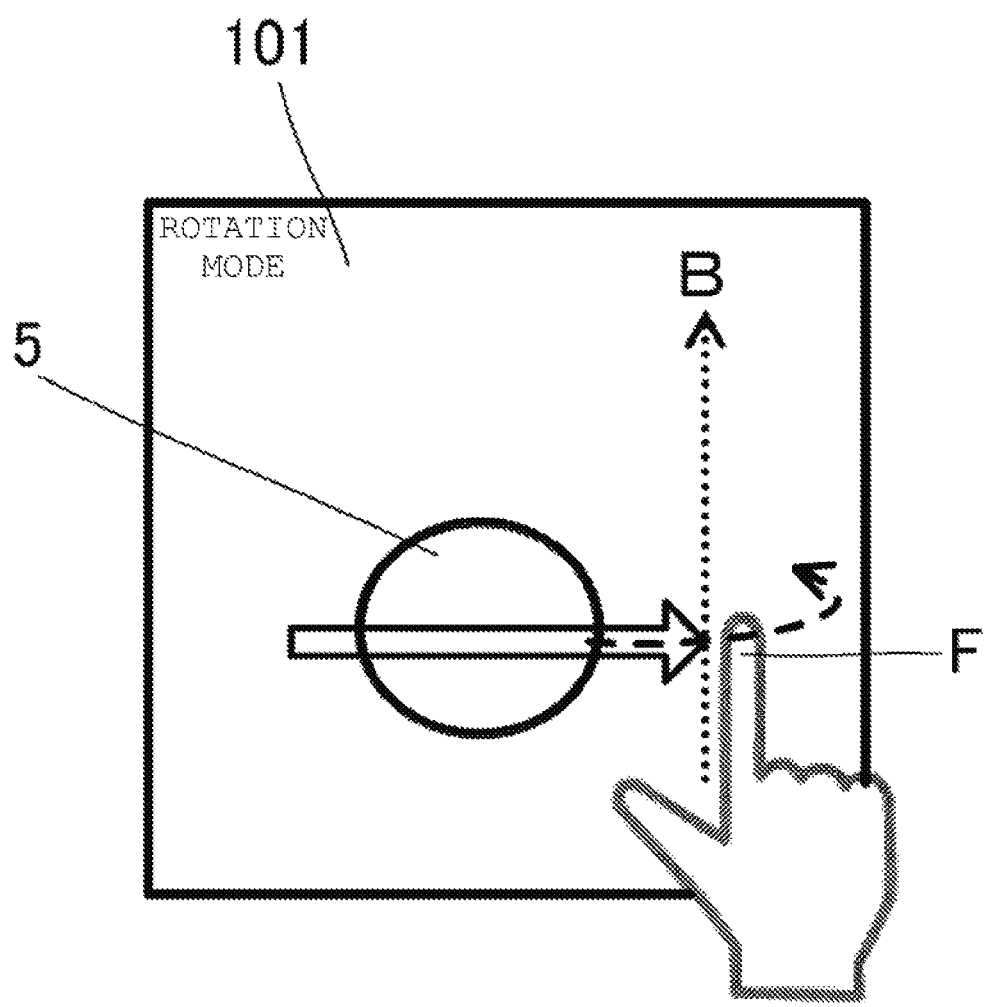
FIG. 13 is a view showing an example of rotation of the 3D image 5 shown in FIG. 12.

In the above embodiment, the rotation axis A of the 3D image 5 is previously set so as to pass through the center of the 3D image 5 as shown in FIGS. 8 and 9, but this is not restrictive. For example as shown in FIGS. 12 and 13, the rotation axis B of the 3D image 5 may be set outside the area of the 3D image 5. For example, the 3D image 5 can rotate around the rotation axis B as shown in FIG. 13.

Figure 14:
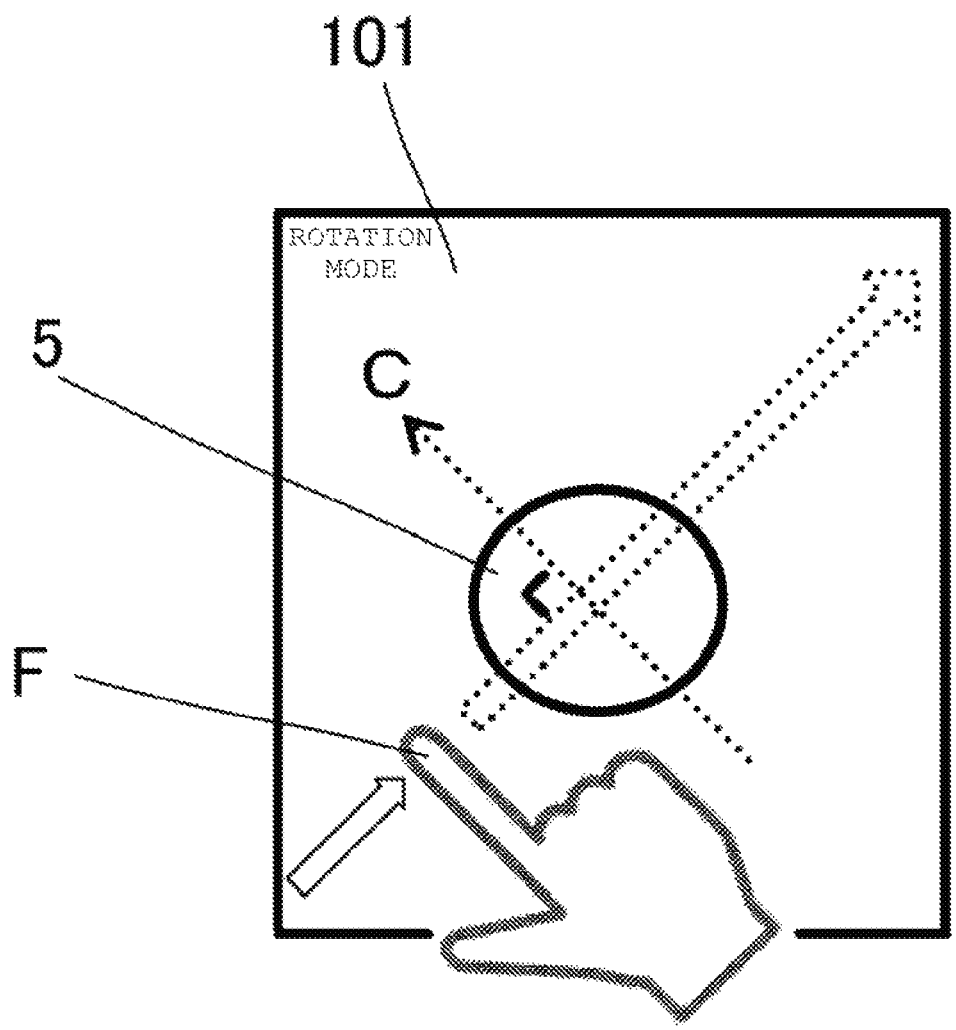
FIG. 14 is a view showing an example of setting of a rotation axis C in the 3D image 5 displayed on the operation surface 101 shown in FIG. 1.
Figure 15:
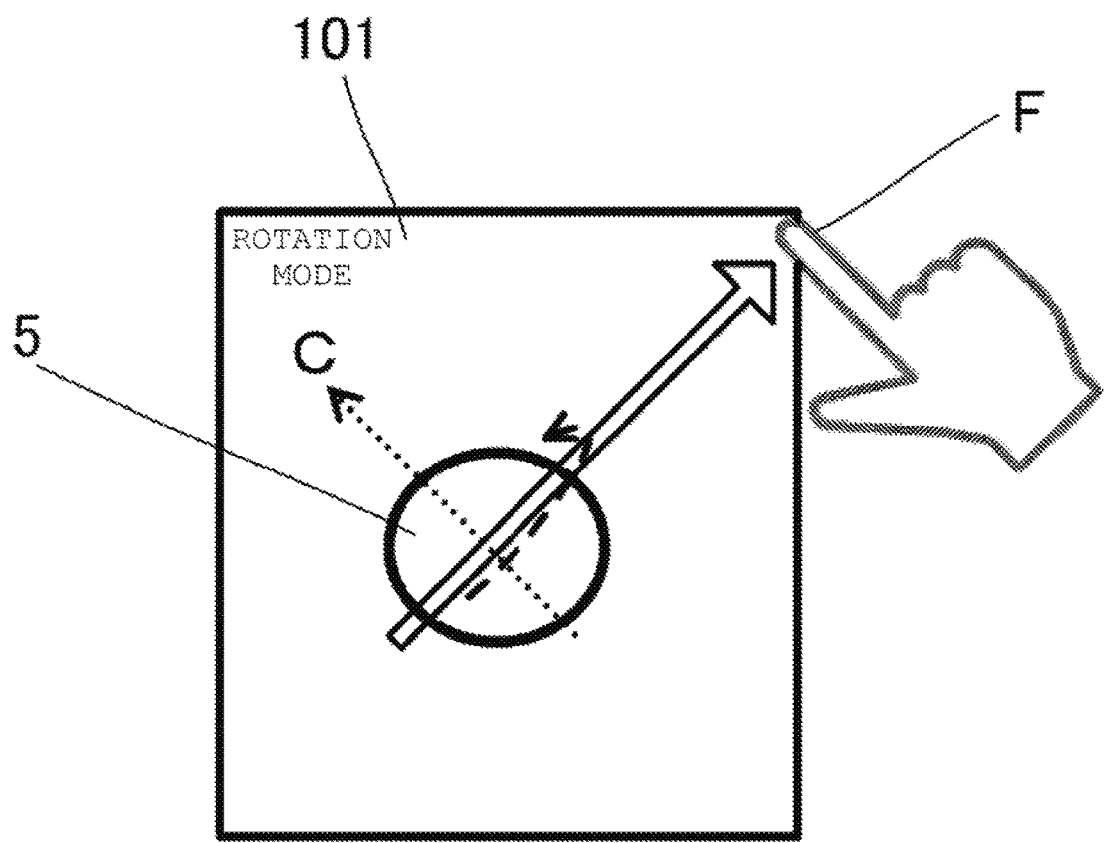
FIG. 15 is a view showing an example of rotation of the 3D image 5 shown in FIG. 14.
Figure 16:
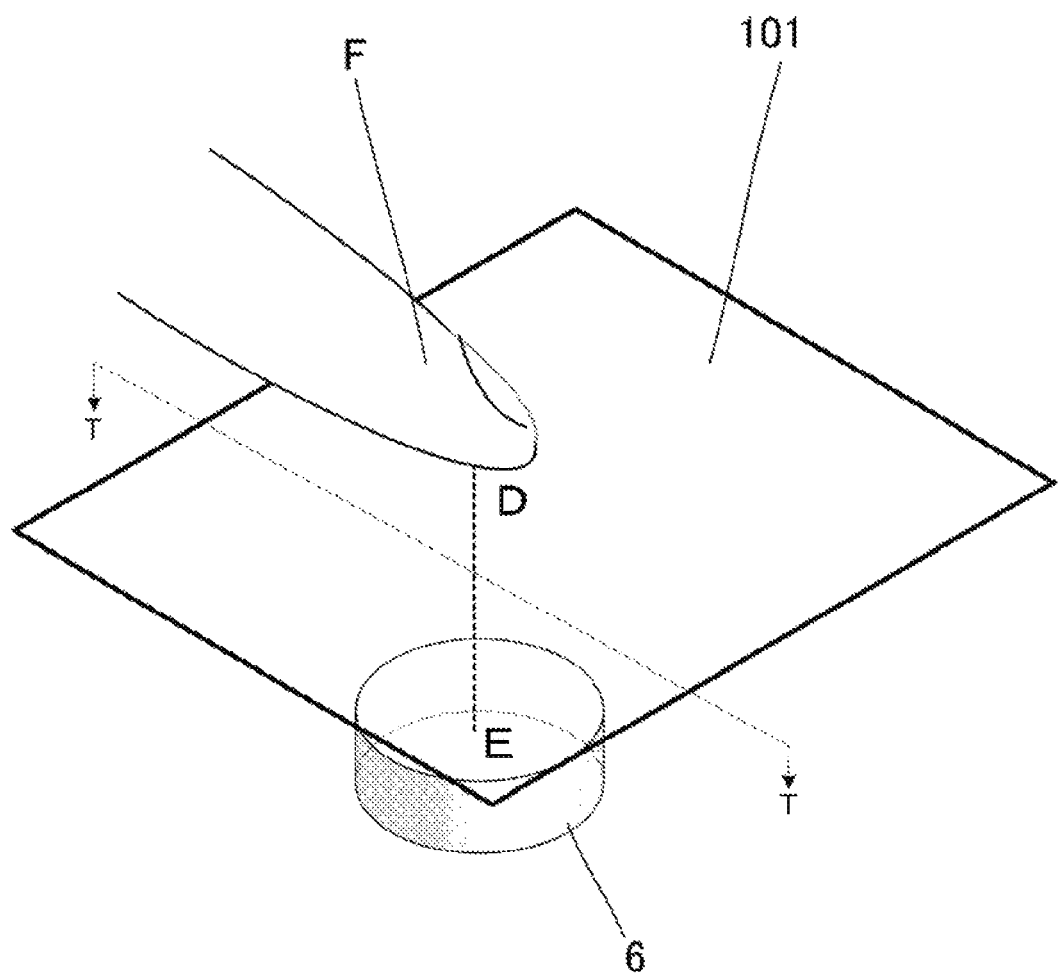
FIG. 16 is an external perspective view of a 3D image 6 displayed on the operation surface 101 shown in FIG. 1.
Figure 17:
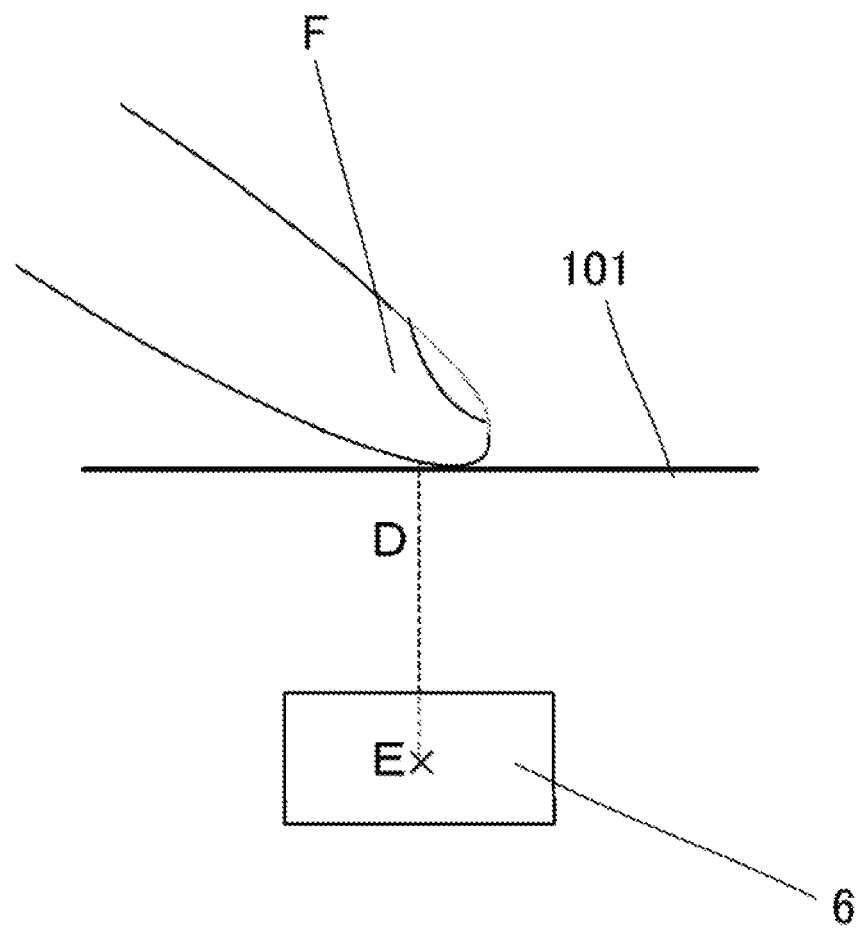
FIG. 17 is a sectional view along line T-T shown in FIG. 16.
Figure 18:
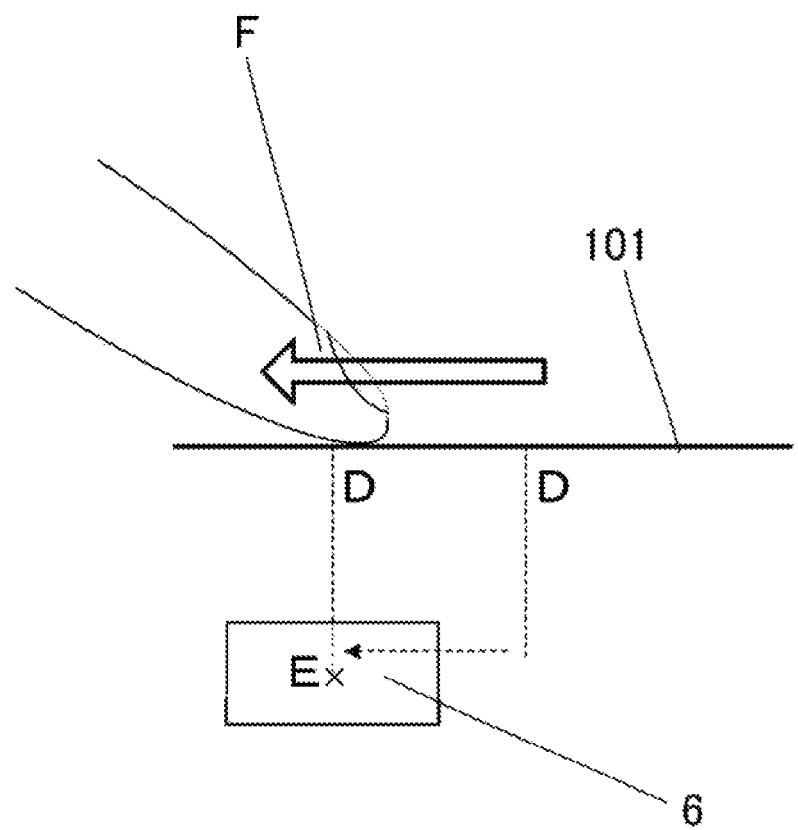
FIG. 18 is a view showing an example of sliding of the 3D image 6 shown in FIG. 16.

In the above embodiments, as shown in FIGS. 8 and 9, the user's finger F slides widthwise on the operation surface 101 and the direction A orthogonal to the sliding direction is set as the rotation axis of the 3D image 5, but this is also not restrictive. For example, as shown in FIGS. 14 and 15, the user's finger F slides in a diagonal direction relative to the operation surface 101 and sets a direction C orthogonal to the sliding direction as the rotation axis of the 3D image 5. In this case, the 3D image 5 rotates around a rotation axis C as shown in FIG. 15.

In the above embodiments, the control unit 20 sets the direction orthogonal to the sliding direction as the rotation axis of the 3D image 5 in S8, but this is also not restrictive. For example, the rotation axis may be adjusted each time based on the moving direction of the finger F (i.e., the direction of movement of the touch position) detected by the position sensor 11D. For example, the rotation axis may be corrected at the point in time when a deviation between the initially expected movement of the finger F and the current movement of the finger F becomes ±5°. This enables more detailed movement. By way of another example, the rotation axis may be corrected at the point in time when a deviation between the initially expected movement of the finger F and the current movement of the finger F becomes ±30°. This enables rotation of the image in the same direction even by rough operation.

Figure 19:
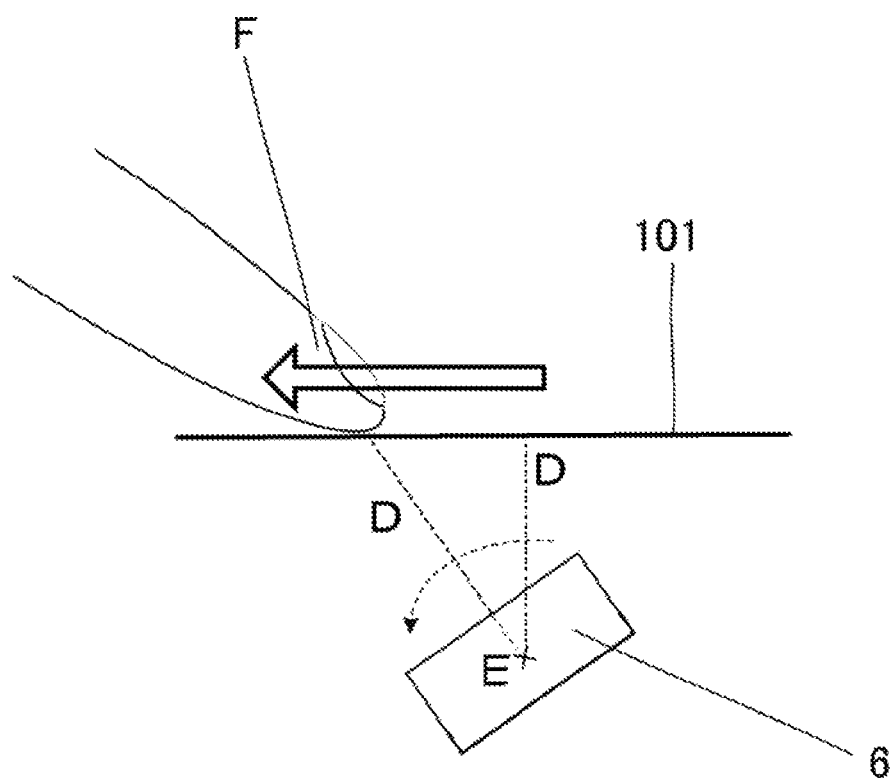
FIG. 19 is a view showing an example of rotation of the 3D image 6 shown in FIG. 16.

In the above embodiments, the control unit 20 sets the rotation axis A in the 3D image 5 having a spherical shape, but this is not restrictive. The control unit 20 may, for example, set a freely selected rotation axis in a 3D image 6 having a cylindrical shape as shown in FIGS. 16 to 19. For example, the control unit 20 may set, as the rotation axis, a line D connecting between a point where the user presses his or her finger F and a center E of the 3D image 6. In FIG. 19, the 3D image 6 is rotated in accordance with sliding movement of the finger F while the center E is fixed.

Figure 20:
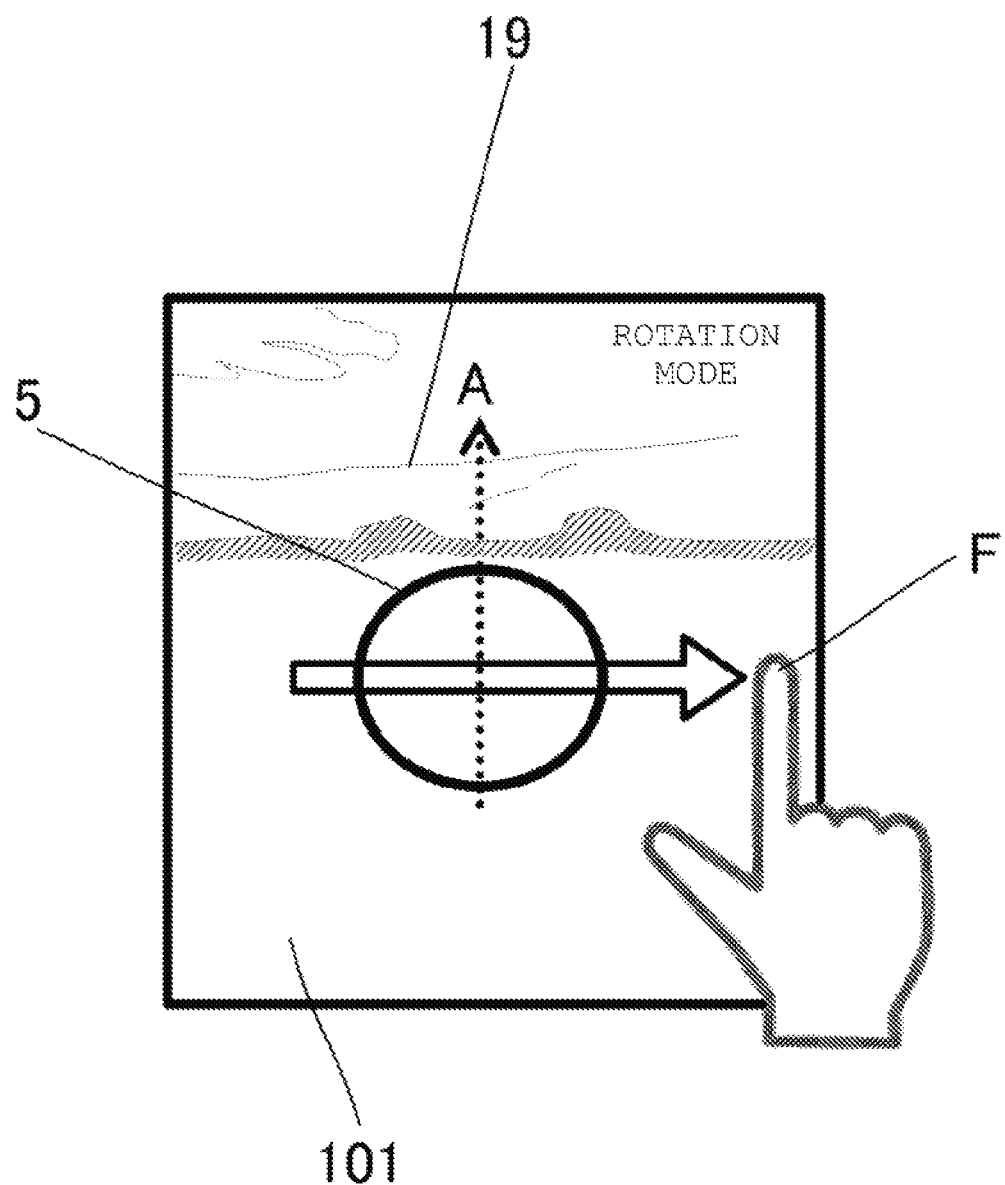
FIG. 20 is a view showing an example of rotation of a viewpoint to the image shown in FIG. 8.

In the above embodiments, the display unit 30 rotates the 3D image 5 around the rotation axis A, but this is not restrictive. For example, in a state where the display unit 30 displays the image shown in FIG. 8 on the operation surface 101, the display unit 30 may rotate a viewpoint around the rotation axis A as shown in FIG. 20. In FIG. 20, the viewpoint has changed and the image displayed on the operation surface 101 has changed from the background image 9 to a background image 19.

Finally, the description of each of the above embodiments should be considered as being illustrative in all respects and not being restrictive. The scope of the present invention is shown not by the foregoing embodiments but by the claims. Further, the scope of the present invention includes an equivalent scope to the scope of the claims.

DESCRIPTION OF REFERENCE SYMBOLS

F: finger
1: display device
5, 6, 7: three-dimensional (3D) image
9: background image
10: operation input unit
11D: position sensor 11D1: insulating substrate
11D2, 11D3: capacitance detecting electrode
11D4: protective film
11P: press sensor
11P1: piezoelectric film
11P2, 11P3: press detection electrode
19: background image
20: control unit
21: storage unit
22: RAM
30: display unit
52: control circuit module
60: wireless LAN communication unit
61: 3G communication unit
70: battery
100: housing
101: operation surface
301: liquid crystal panel
302: top surface polarizing plate
303: rear surface polarizing plate
304: backlight
900: uniaxially stretching direction

The invention claimed is:

1. A touch input device, comprising:
an operation surface;
a position sensor that detects both a presence and a movement of a touch position on the operation surface;
a pressure sensor that detects a pressing force applied to the operation surface;
a display that displays a plurality of 3D images; and
a controller that rotates a selected one of the images as a function of the movement of the touch position along the operation surface when the detected pressing force satisfies a predetermined condition and the controller allows the user of the touch input device to select the image to be rotated by touching the operation surface at a touch position corresponding to the selected image and simultaneously applying a pressing force to the operation surface which is less than or equal to a predetermined value.

2. The touch input device according to claim 1, wherein when the predetermined condition is met, the image is rotated in a direction determined by a direction of movement of the touch position.

3. The touch input device according to claim 1, wherein the predetermined condition is that the pressing force is greater than or equal to a first threshold.

4. The touch input device according to claim 1, wherein:
the operation surface, the position sensor, the press sensor and the display are laminated together to define a touch panel; and
the display displays the image on the operation surface.

5. The touch input device according to claim 1, wherein a rotation speed at which the image is rotated by the controller is a function of the speed at which the touch position moves across the operation surface.

6. The touch input device according to claim 1, wherein an amount that the image is rotated by the controller is a function of the distance that the touch position is moved across the operation surface.

7. The touch input device according to claim 1, wherein an axis of rotation about which the controller rotates the image passes through a previously set center of rotation at an angle that is a function of a direction movement of the touch position across the operation surface.

8. The touch input device according to claim 7, wherein the axis of rotation is orthogonal to a direction of movement of the touch position across the operation surface.

9. The touch input device according to claim 1, wherein the controller stops rotating the image when it determines that the touch position is no longer present.

10. A touch input device, comprising:
an operation surface;
a position sensor that detects both a presence and a movement of a touch position on the operation surface;
a pressure sensor that detects a pressing force applied to the operation surface;
a display that displays a 3D image; and
a controller that rotates the image as a function of the movement of the touch position along the operation surface when the detected pressing force is greater than or equal to a first threshold and stops rotating the image when the pressing force applied to the operation surface becomes smaller than a second threshold which is less than the first threshold.

11. The touch input device according to claim 10, wherein the controller stops rotating the image when the pressing force applied to the operation surface is equal to or larger than a third threshold which is greater than the first threshold.

12. The touch input device according to claim 11, wherein the controller stops rotating the image when it determines that the touch position is no longer present.

13. The touch input device according to claim 10, wherein when the predetermined condition is met, the image is rotated in a direction determined by a direction of movement of the touch position.

14. The touch input device according to claim 10, wherein the predetermined condition is that the pressing force is greater than or equal to a first threshold.

15. The touch input device according to claim 10, wherein:
the operation surface, the position sensor, the press sensor and the display are laminated together to define a touch panel; and
the display displays the image on the operation surface.

16. The touch input device according to claim 10, wherein a rotation speed at which the image is rotated by the controller is a function of the speed at which the touch position moves across the operation surface.

17. The touch input device according to claim 10, wherein an amount that the image is rotated by the controller is a function of the distance that the touch position is moved across the operation surface.

18. The touch input device according to claim 10, wherein an axis of rotation about which the controller rotates the image passes through a previously set center of rotation at an angle that is a function of a direction movement of the touch position across the operation surface.

19. The touch input device according to claim 18, wherein the axis of rotation is orthogonal to a direction of movement of the touch position across the operation surface.

20. A touch input device, comprising:
an operation surface;
a position sensor that detects both a presence and a movement of a touch position on the operation surface;
a pressure sensor that detects a pressing force applied to the operation surface;
a display that displays a 3D image; and
a controller that rotates the image as a function of the movement of the touch position along the operation surface, the controller rotating the object when the pressing force is greater than a predetermined value and moving the object across the operation surface when the pressing force is less than the predetermined value.

21. The touch input device according to claim 20, wherein the image is rotated in a direction determined by a direction of movement of the touch position.

22. The touch input device according to claim 20, wherein:
- the operation surface, the position sensor, the press sensor and the display are laminated together to define a touch panel; and
- the display displays the image on the operation surface.

23. The touch input device according to claim 20 wherein a rotation speed at which the image is rotated by the controller is a function of the speed at which the touch position moves across the operation surface.

24. The touch input device according to claim 20, wherein an amount that the image is rotated by the controller is a function of the distance that the touch position is moved across the operation surface.

25. The touch input device according to claim 20, wherein an axis of rotation about which the controller rotates the image passes through a previously set center of rotation at an angle that is a function of a direction movement of the touch position across the operation surface.

26. The touch input device according to claim 25, wherein the axis of rotation is orthogonal to a direction of movement of the touch position across the operation surface.

27. The touch input device according to claim 20, wherein the controller stops rotating the image when it determines that the touch position is no longer present.

\* \* \* \* \*